Figure 1:
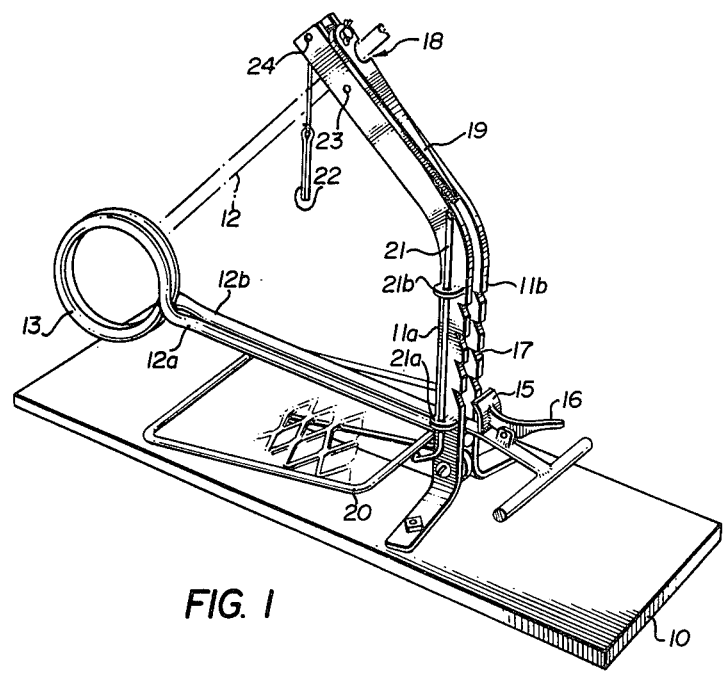

United States Patent [19]

Thebeau

[11] 4,255,892
[45] Mar. 17, 1981

[54] HUMANE ANIMAL TRAP

[75] Inventor: Vital J. Thébeau, Nackawic, Canada

[73] Assignee: Canadian Patents and Development Limited, Ottawa, Canada

[21] Appl. No.: 66,089

[22] Filed: Aug. 13, 1979

[51] Int. Cl.³ .............................................. A01M 23/24
[52] U.S. Cl. ........................................ 43/81; 43/81.5; 43/85
[58] Field of Search ...................... 43/80, 81, 81.5, 82, 43/83, 83.5, 85, 86

[56] References Cited

U.S. PATENT DOCUMENTS

| 293,683 | 2/1884 | Symonds | 43/81 |
|---|---|---|---|
| 940,877 | 11/1909 | Janke | 43/85 |
| 1,303,547 | 5/1919 | Ellison | 43/85 |
| 1,455,131 | 5/1923 | Ziola | 43/81 |
| 2,779,124 | 1/1957 | Transtrom | 43/85 |
| 3,534,493 | 10/1970 | Dahlgren | 43/85 X |
| 3,757,457 | 9/1973 | Martin | 43/82 |

*Primary Examiner*—Nicholas P. Godici
*Attorney, Agent, or Firm*—James R. Hughes

[57] ABSTRACT

An animal trap having an upstanding frame member mounted on a base, a metal anvil bar connected at one end to the frame and extending outwardly from the frame generally parallel to the base, a metal striker bar positioned above and generally parallel to the anvil bar, said bars being connected at their outer ends to a spring adapted to urge the striker bar forcibly towards the anvil bar, a trigger pan mounted below the two bars and connected to a trigger arm extending upwardly along the frame, a latch arm swivelly mounted on the upper portion of the frame and containing a notch or recess such that when the striker bar is moved upwards against the force of the spring away from the anvil bar, the bar fits into the notch, said latch having an extended arm contacting the upper end of said trigger bar such that the trigger bar is operative to trigger the latch arm from the set position on movement of the pan and allow the latch arm to swing free and the striker bar to move towards the anvil bar. In a preferred version clamping means is provided for forcibly holding the striker bar down towards the anvil bar to provide a secondary killing action.

3 Claims, 7 Drawing Figures

HUMANE ANIMAL TRAP

This invention relates to animal traps and more particularly to a humane animal trap that will operate when the animal is passing through the trap.

There have been many animal trap designs put forward in the past for catching different types of animals in various ways. It has been considered that the type which is designed to strike the neck or back of the animal as distinguished from the jaw type for grasping and holding a leg of the animal, is more humane. A well known type of trap in present use is the Conibear trap described in U.S. Pat. No. 3,010,245 issued Nov. 28, 1961 to F. R. Conibear. Other trap designs are described in the following U.S. Patents:

U.S. Pat. No. 462,343 to G. H. Wells dated Nov. 3, 1891
U.S. Pat. No. 654,928 to T. H. Taylor dated July 31, 1900
U.S. Pat. No. 968,990 to J. R. Schruyber dated Aug. 30, 1910
U.S. Pat. No. 1,003,303 to T. H. Taylor dated Sept. 12, 1911
U.S. Pat. No. 1,455,131 to E. L. Ziola dated May 15, 1923
U.S. Pat. No. 1,538,201 to J. D. Monie dated May 19, 1925
U.S. Pat. No. 1,592,155 to G. Redford dated July 13, 1926
U.S. Pat. No. 1,665,020 to W. Catlin dated Apr. 3, 1928
U.S. Pat. No. 1,802,272 to W. R. Rice dated Apr. 21, 1931
U.S. Pat. No. 2,087,440 to H. J. Merz dated July 20, 1937
U.S. Pat. No. 2,191,570 to R. C. Lewis dated Feb. 27, 1940
U.S. Pat. No. 3,757,457 to A. M. Martin dated Sept. 11, 1973
U.S. Pat. No. 3,936,973 to W. Larocque dated Feb. 10, 1976.

It is an object of the present invention to provide a human animal trap that will strike an animal passing through the trap on the back or the neck generally killing it instantly.

It is another object of the invention to provide an animal trap having a clamping means such as to hold the animal in the trap should it only be stunned on the initial striking action.

This and other objects of the invention are achieved by an animal trap having an upstanding frame member mounted on a base, a metal anvil bar connected at one end to the frame and extending outwardly from the frame generally parallel to the base, a metal striker bar positioned above and generally parallel to the anvil bar, said bars being connected at their outer ends to a spring adapted to urge the striker bar forcibly towards the anvil bar, a trigger pan mounted below the two bars and connected to a trigger arm extending upwardly along the frame, a latch arm swivelly mounted on the upper portion of the frame and containing a notch or recess such that when the striker bar is moved upwards against the force of the spring away from the anvil bar, the bar fits into the notch, said latch having an extended arm contacting the upper end of said trigger bar such that the trigger bar is operative to trigger the latch arm from the set position on movement of the pan and allows the latch arm to swing free and the striker bar to move towards the anvil bar. In a preferred version clamping means is provided for forcibly holding the striker bar down towards the anvil bar to provide a secondary killing action.

Figure 2:
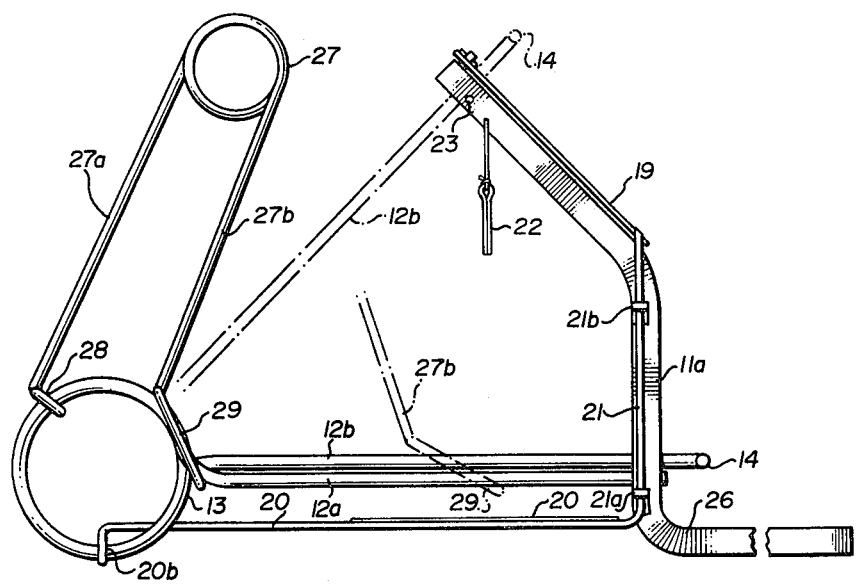
Figure 3:
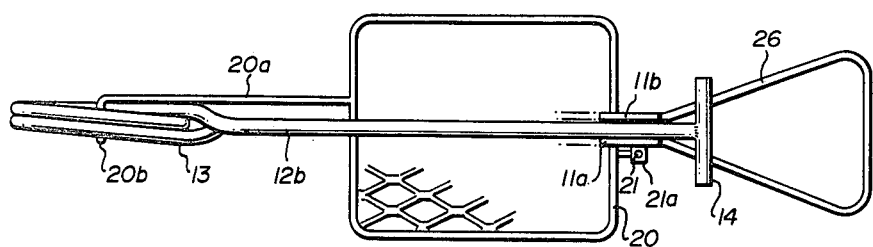
Figure 4:
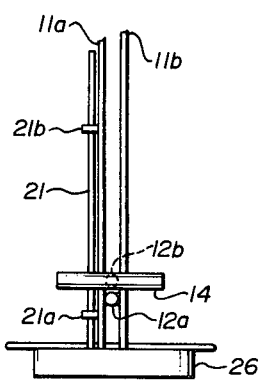
Figure 5:
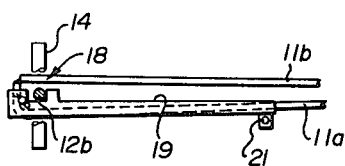
Figure 6:
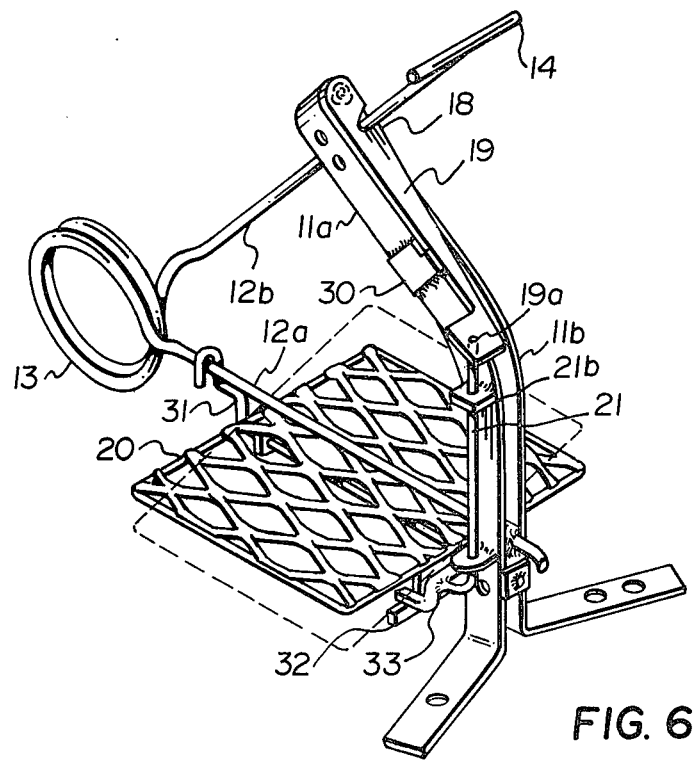
Figure 7:
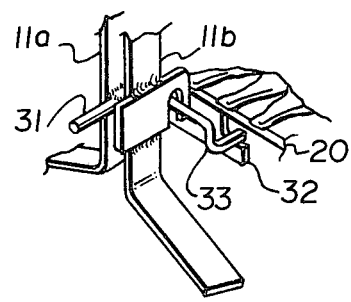

In drawings which illustrate embodiments of the invention,

FIG. 1 is a perspective view of the trap,
FIG. 2 is a cross-section of a variant form of the trap,
FIG. 3 is a partial plan view of the trap of FIG. 2.
FIG. 4 is a partial end view of the trap of FIG. 2,
FIG. 5 is a top view of the trigger mechanism of the trap of FIG. 2,
FIG. 6 is a perspective view of variant form of the trap, and
FIG. 7 is a partial view of the trap of FIG. 6 showing trigger action.

Referring to FIG. 1, the trap is made up of a suitable base 10 on which is mounted a frame made up of two parallel positioned, L-shaped members 11a and 11b. Fixed between these members by welding or other suitable means is an anvil bar 12a which extends outwardly parallel to the base and terminates in a single spring 13 formed by one or more coiled turns. The other end of the spring 13 extends inwardly, parallel to and above the anvil bar 12a to form the striker bar 12b. This bar extends through frame members 11a and 11b and terminates in a T-bar 14 convenient for the user in setting the trap. The single spring has been designed to urge the striker bar down towards the anvil bar and stores sufficient energy to deliver a striking force of somewhere between 200 and 350 inch-pounds of energy. The spring is also designed to produce a clamping force of about 20 pounds at a 1 inch opening position. A ratchet device made up of blade 15 and handle 16, spring loaded mounted on the striker bar 12b, is arranged to catch into notches 17 cut into frame members 11a and 11b. Tis device gives an additional resistance to prying open of the trap by the animal. Clamping and/or prying forces are valuable features in humane trap design since they provide a secondary killing action should the initial strike merely stun the animal.

The trap is set by raising striker bar 12b against the force of the spring by means of T-bar 14 until it takes the position shown in dotted lines. The bar fits into a notch or detent 18 formed in spring latch 19 rotatably mounted in the fixed upper ends of frame members 11a and 11b. The trap is set off (triggered) by an animal passing over the anvil bar through the trap and depressing a trigger pan 20 rotatably mounted in the frame and positioned just below the anvil bar. Connected to the pan is a trigger bar 21 passing from the trigger pan through sleeves 21a and 21b to terminate adjacent the end of spring latch 19. When the trap is set the upper end f the trigger bar mechanism is in a position to prevent the spring latch from swinging sideways. When the trigger pas is depressed, the trigger bar moves downward until the end is free of latch 19 allowing the latter to swing to the side releasing the striker bar for downward striking action. A safety locking action is provided by pin 22 connected to the end of the frame which when positioned in opening 23 prevents inadvertent setting off of the trap. Storage of the pin is provided by opening 24.

FIGS. 2, 3, and 4 show elevation, plan and end view of a variant form of the trap. The frame members 11a and 11b are similar to FIG. 1 but at their bottom extend out into a base structure 26. The anvil bar 12a, striker bar 12 b with T-bar handle 14, and spring 13 are similar to the FIG. 1 version but there is no ratchet mechanism on the striker bar. In this version the prying or clamping force is provided by an auxiliary spring 27 having extended arms 27a and 27b, the first of which is connected to a loop 28 encircling the spring and the second of which is connected to a larger loop 29 encircling the striker and anvil bars. Spring 27 is designed to urge loop 29 along the arms and when the trap is sprung, the loop takes up a position as shown in dotted lines to provide a clamping force on the bars and thus the animal. The trigger mechanism again comprises a a trigger pan 20 which is connected to the spring through arm 20a and loop 20b and to trigger bar 21 passing through sleeves 21a and 21b and up through an opening in spring latch 19. The operation of the spring latch and trigger bar is readily seen in FIG. 5.

FIGS. 6 and 7 show a trap similar to the FIG. 1 version but with a differing triggering action. Pan or treadle 20 is rotatably mounted on bar 12a by means of rod 31 extending under the pan with one end hooking over bar 12a and the other end fixed between members 11a and 11b. A member 32 is fixed to the pan and rotates with it. When the pan is depressed (in either direction), member 32 forces structure 33 upwards causing trigger bar 21 to rise pushing spring latch 19 upward at point 19a sufficiently to allow it to clear trigger stop 30 and swing sideways. This action frees bar 12b from notch 18 holding it and the bar strikes downward towards anvil bar 12a as urged by spring 13.

Although this version of the trap does not show the secondary holding mechanism show in FIGS. 1 and 2, i.e. the ratchet 17 and the spring device 27, 27a 27b, these can be incorporated with some modification.

I claim:
1. A humane animal trap comprising:
(a) a base,
(b) an upstanding frame member mounted on the base,
(c) a metal anvil bar connected at one end to the frame and extending outwardly generally parallel to the base,
(d) a metal striker bar positioned above and generally parallel to the anvil bar,
(e) a spring connected to the anvil bar and the striker bar and adapted to urge the striker bar forcibly towards the anvil bar,
(f) a trigger arm mounted on and extending upwardly along the frame,
(g) a trigger pan mounted below the two bars and connected to the trigger arm,
(h) a latch arm swivelly mounted on the upper portion of the frame and containing a notch or recess such that when the striker arm is moved upwards against the force of the spring away from the anvil bar to the set position, the arm fits into the notch, said latch arm having an extended portion contacting the upper end of said trigger arm such that the trigger arm is operative to trigger the latch arm from the set position on movement of the trigger pan and allow the latch arm to swing free and the striker bar to move towards the anvil, and
(i) clamping means for forcibly holding the striker bar down towards the anvil bar to provide a secondary killing action.

2. A humane animal trap as in claim 1 wherein the clamping means is a ratchet mechanism fixed on the striker bar and cooperating with notches formed in the frame member.

3. A humane animal trap as in claim 1 wherein the clamping means is an auxiliary coil spring connected to urged apart arms, one of said arms being connected to the said spring and the other to a metal loop encircling the anvil and striker bars such that when the trap is set, the loop lies adjacent the spring and when the trap is sprung, the loop slides along the two bars closing on each other such as to hold the bars in a closed, clamping position.

* * * * *